H. J. LOCKHART.
BULL WHEEL.
APPLICATION FILED JULY 26, 1919.
1,333,122.
Patented Mar. 9, 1920.
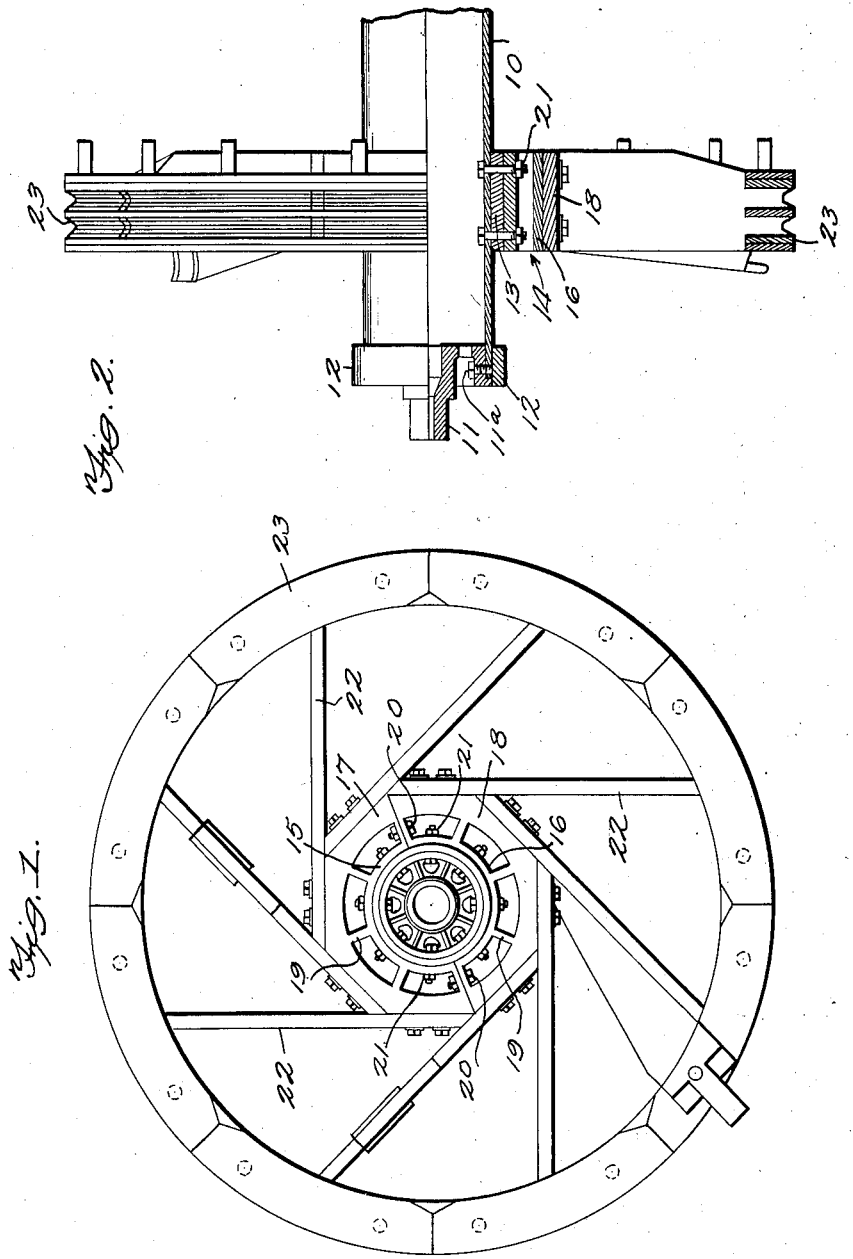
Inventor
Harold J. Lockhart,
By
C. M. Parker,
Attorney

UNITED STATES PATENT OFFICE.

HAROLD J. LOCKHART, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

BULL-WHEEL.

1,333,122.  Specification of Letters Patent.  Patented Mar. 9, 1920.

Application filed July 26, 1919. Serial No. 313,593.

*To all whom it may concern:*

Be it known that I, HAROLD J. LOCKHART, a citizen of the United States, residing at Parkersburg, in the county of Wood and State of West Virginia, have invented certain new and useful Improvements in Bull-Wheels, of which the following is a specification.

This invention relates to new and useful improvements in bull wheels and has for an object the provision of a bull wheel readily removable from the shaft, the parts of which are readily changeable.

Bull wheels are at present generally used with a hollow wooden shaft, and this shaft in order to reinforce the outer end thereof, is provided with a band which is generally shrunk into place. Bull wheels have been provided with hubs which are formed of separable sections, allowing of their removal from the shaft, but with these bands in place upon the shaft, it is necessary to destroy the felly of the wheel in order to remove the hub.

In many cases it is desirable to remove the wheel without destroying the periphery thereof, and to allow this to be done I have provided a bull wheel having split hub, beneath which is arranged a special bushing of the same thickness as the reinforcing band, so that the hub when released from the shaft, may be slipped over the end of the shaft without destroying the felly of the wheel.

Other objects of my invention will become apparent in the course of the following description.

In the accompanying drawing, wherein, for the purpose of illustration is shown the preferred embodiment of my device, Figure 1 is a side illustration, partly in section, of a bull wheel shaft embodying my invention, and—

Fig. 2 is a side elevation thereof.

Referring now more particularly to the drawings, the numeral 10 indicates a hollow shaft formed preferably of wood. As the two ends of the shaft are practically identical, but one end thereof is shown and described. In the end of the shaft is mounted a gudgeon 11, secured to the shaft by means of bolts 11$^A$. Surrounding the outer end of the shaft is a reinforcing band 12 shrunk upon the shaft.

Mounted upon the shaft is a bushing 13, as thick as, or thicker than the reinforcing band 12. Surrounding this bushing is a divided hub 14, which is split diametrically into two halves. The halves are provided with hub sections 15 and 16, respectively, secured to rim sections 17 and 18. The means for securing the hub sections and rim sections together, comprises radially extending spokes 19. As will be clearly seen by referring to Fig. 2, the sections are bolted together as at 20, about the bushing 13. The flanged rim being spaced from the hub section, provides spaced openings allowing ready access to the nuts of the bolts 21. These bolts extend through the hub section, bushing and wall of the hollow shaft 10, thus securely anchoring the hub upon the shaft.

The outer face of the hub section is made polygonal in form to provide seats for the inner ends of the tangential arms 22 of the bull wheel to which the outer rim or felly of the wheel is secured. In the present instance this felly is shown as comprising a plurality of cants 23, secured to the arms 22 and to one another.

It will be obvious that by removing the nuts from the bolts 21, the wheel may be removed from the shaft over the reinforcing band, without destroying the felly thereof. It will also be obvious that the bolts extending into the shaft, prevent either rotation or longitudinal displacement of the wheel.

It will be understood that the form of my invention, herein shown and described, is to be taken as a preferred symbol of the same, and that various changes in the shape, size and arrangement of the parts, may be resorted to without departing from the spirit of the invention or the scope of the subjoined claim.

Having thus described my invention, I claim:

The combination with a hollow shaft having a reinforcing band shrunk upon the end thereof, of a bushing as thick as said reinforcing band mounted upon said shaft, a split hub surrounding said bushing, said split hub comprising hub sections, and rim sections spaced therefrom, radial spokes securing said hub sections and rim sections together, bolts extending through said hub sections, bushing, and the wall of said hollow shaft, said rim sections being polygonal in form, tangential arms, means for securing the inner ends of said tangential arms to the faces of said rim section and cants connecting the outer ends of said arms.

In testimony whereof I affix my signature, in presence of two witnesses.

HAROLD J. LOCKHART.

Witnesses:
F. V. CANNON,
D. M. LONG.